Feb. 5, 1924.

B. P. JOYCE

SPADE

Filed Sept. 6, 1923

INVENTOR
Bryan P. Joyce.
BY
W. N. Roach.
ATTORNEY

Feb. 5, 1924.

B. P. JOYCE

SPADE

Filed Sept. 6, 1923

INVENTOR
Bryan P. Joyce.
BY
W. N. Roach,
ATTORNEY

Patented Feb. 5, 1924.

1,482,400

UNITED STATES PATENT OFFICE.

BRYAN P. JOYCE, OF DAVENPORT, IOWA.

SPADE.

Application filed September 6, 1923. Serial No. 661,267.

(FILED UNDER THE ACT OF MARCH 3, 1883, 22 STAT. L., 625.)

*To all whom it may concern:*

Be it known that I, BRYAN P. JOYCE, a citizen of the United States, and a resident of Davenport, county of Scott, and State of Iowa, have invented an Improvement in Spades, of which the following is a specification.

The invention described herein may be used by the Government, or any of its officers or employees in prosecution of work for the Government, or by any other person in the United States, without payment to me of any royalty thereon, in accordance with the act of March 3, 1883.

The present invention relates to means for securing trail spades in traveling position.

In certain types of guns it is necessary to remove the spade from its trail in traveling.

The primary object of my invention is the provision of means for securing the spade in its traveling position.

Another object is the provision of means whereby the spades may be secured in traveling position upon the trail.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing in which Fig. 1 is a fragmentary plan view of the trails showing the spades positioned thereon;

Figure 1:
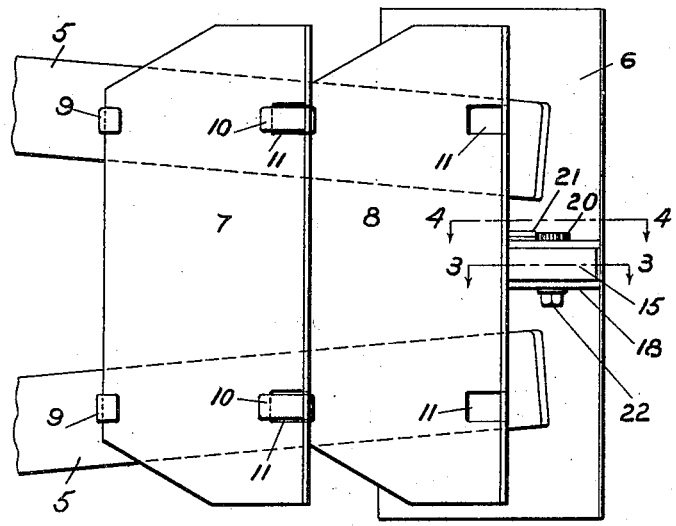
Figure 2:
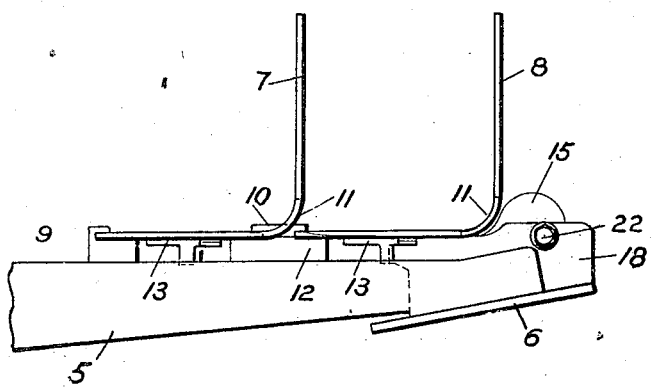
Fig. 2 is a fragmentary view in side elevation.
Figure 5:
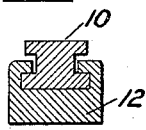
Fig. 5 is a detail sectional view showing the slidable T-head and its support.
Figure 3:
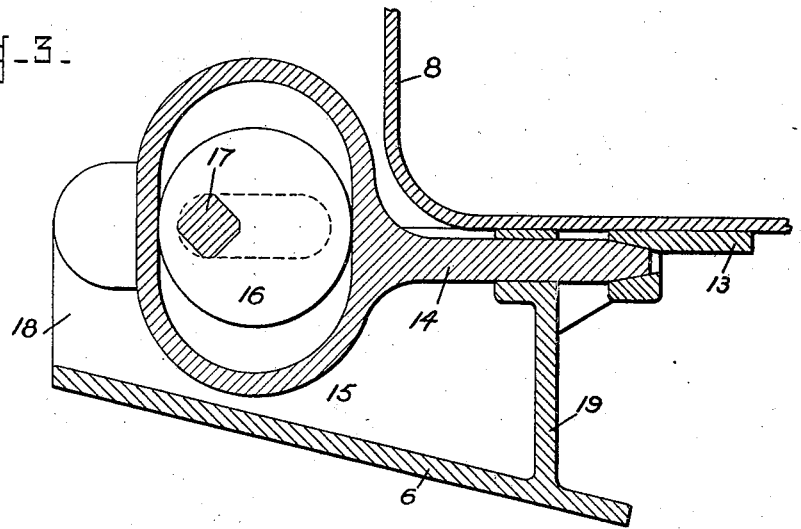
Fig. 3 is a section on the line 3—3 of Fig. 1.
Figure 4:
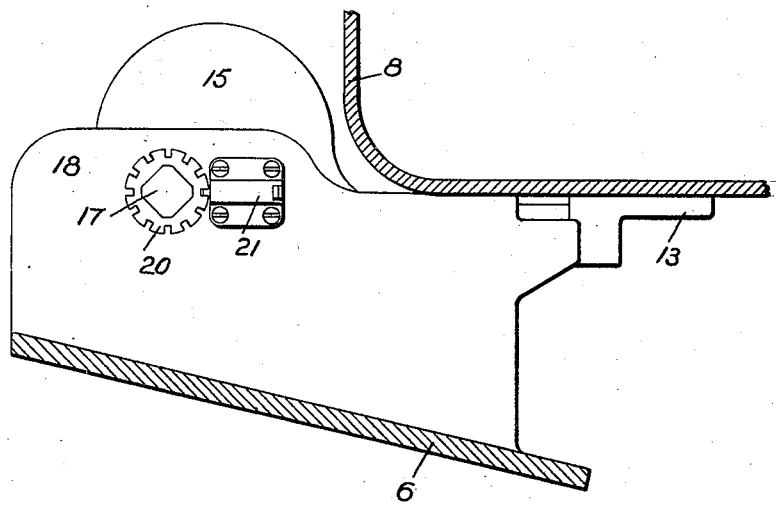
Fig. 4 is a section on the line 4—4 of Fig. 1.

Referring to the drawing by numerals of reference:

I have shown at 5—5 the trail members of a split trail. These trail members in traveling position are supported on a limber 6. As the means for securing these trail members to the limber is not an essential part of this invention it has not been described here. The trail members 5 in travel are used to support their respective spades 7 and 8. Notched lugs 9 are provided on the trails at a point intermediate their length and within the notches one edge of the spade 7 is seated. Each of the spades is provided with a slot 11. T-heads 10 slidable in supports 12 attached to the trail members are adapted to enter the slot of one of the spades and overlie an edge defining the slot and the edge of the next succeeding spade to secure the spades in position upon the trails.

Any suitable locking means may be employed for maintaining the spades in their traveling position. As illustrated I have shown each of the spades provided with a lug 13 secured to that side of the spades which rest upon the positioning members 9 and 12. These lugs 13 are provided with openings adapted to register with the locking member.

The locking member 14 is provided with a housing 15 enclosing a cam member 16 which is mounted upon a shaft 17 journaled in side walls 18 rising from the limber, so that by rocking of the cam member the locking member is reciprocated. This locking member is adapted to be reciprocated into the opening of the lug 13 of the spade 8 for securing said spade in position and through the intermediation of the T-head 10 and the positioning member 9 locking the spade 7 in position also. A cross-wall 19 extends between the side walls 18 and is provided with an aperture for the purpose of guiding the locking member in its reciprocable movement. At one end and exteriorly of one of the walls 18 the shaft 17 has rigidly mounted thereon a notched ring 20. Mounted on this wall 18, adjacent the notched ring is a spring catch 21 for cooperating with the notched ring to secure the cam member in any adjusted position. At its opposite end and externally of the other wall 18 the shaft 17 is provided with a hexagonal or other suitably shaped nut 22 to cooperate with a wrench or other suitable tool for moving the locking member to and from its locking and released positions.

In travel the spades are first removed from the trails, the trails seated upon the limber and secured thereto, spade 7 is then positioned against the lug 9 and the sliding member 10 is positioned through the slot 11 of this spade and engaged with the end of the spade 8 and the locking member 14 is then moved into locking engagement with the lug 13 on the spade 8. In this manner both spades are securely fastened to the trails. When the gun is brought to firing position the reverse of this operation is pursued.

While I have described the spade 7 as positioned against the lugs 9 it is evident that since both spades are provided with slots 11 the position of either may be changed at will.

I claim:

1. A traveling lock for trail spades including a supporting member, a plurality of spades successively arranged on said supporting member, a lug on said member against which the spade at one end of the series is positioned, said spades provided with slots, T heads on said supporting member cooperating with successive spades, one arm of a T engaging an edge defining the slot of one spade the other arm retaining the next succeeding spade in position, lugs on said spades, a reciprocable locking member provided with a housing, a cam member rotatably mounted in said housing and actuating said locking member to engage the lug of the spade at the other end of the series to lock all of said spades in position, means for guiding said locking member in its reciprocable movement and means for maintaining said cam member in any adjusted position.

2. A traveling lock for trail spades, including a supporting member, a plurality of spades successively arranged on said supporting member, a lug on said member by which the spade at one end of said series is positioned, said spades provided with slots, means on said supporting member entering the slot of one spade and cooperating with a portion of the next succeeding spade to retain said spades on the supporting member and means cooperating with the spade at the other end of said series to lock all of said spades in position.

3. A traveling lock for trail spades, including a supporting member, a plurality of spades successively arranged on said supporting member, means on said member by which one of said spades is positioned, means cooperating with portions of successive spades for retaining them in position and reciprocable cam actuated means cooperating with one of said spades for locking all of said spades in position.

4. A traveling lock for trail spades including a supporting member, a plurality of spades successively arranged on said supporting member, means on said member by which one of said spades is positioned, means cooperating with portions of successive spades for maintaining them in position and reciprocable locking means cooperating with one of said spades for locking all of said spades in position.

5. A traveling lock for trail spades, including a supporting member, a plurality of spades successively arranged on said supporting member, means on said member by which one of said spades is positioned, means cooperating with portions of successive spades for maintaining them in position and locking means cooperating with one of said spades to lock all of said spades in position.

6. In a traveling lock for trail spades, the combination with a limber, a trail supported on said limber, and a spade on said trail, of a lug on said trail against which a portion of said spade is seated, a lug on said spade and a cam actuated reciprocable locking means on said limber cooperating with said spade lug to lock said spade in traveling position.

7. In a traveling lock for trail spades, the combination with a limber, a trail supported on said limber and a spade on said trail, of means on said trail by which said spade is positioned and means on said limber cooperating with said first named means for locking said spade on said trail.

8. In a traveling lock for trail spades the combination with a limber, a trail supported on said limber and a spade on said trail, of cooperating means on said trail and limber for locking said spade in traveling position with respect to said trail.

9. In a traveling lock for trail spades, the combination with a trail of a spade adapted to be removably secured to the trail in different positions for firing and for travel, a lug on the trail against which one end of the spade may be seated for travel, a lug on the spade, a locking member adapted to engage the spade lug and provided at one end with a housing and a cam rotatably mounted in said housing for reciprocating the locking member to lock or release said spade in its traveling position.

10. In a traveling lock for trail spades, the combination with a trail of a spade adapted to be removably secured to the trail in different positions for firing and for travel, of a lug on the trail against which the spade may be positioned in travel, a lug on the spade and reciprocable cam actuated means engaging the lug on the spade to removably lock the spade in traveling position on the trail.

BRYAN P. JOYCE.